(12) United States Patent
Park (10) Patent No.: US 7,307,988 B1
(45) Date of Patent: Dec. 11, 2007

(54) ADDRESS SEARCH APPARATUS AND METHOD IN ETHERNET SWITCH

(75) Inventor: Woo-Jong Park, Suwon-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1266 days.

(21) Appl. No.: 09/716,998

(22) Filed: Nov. 22, 2000

(30) Foreign Application Priority Data

Nov. 22, 1999  (KR) ............................... 1999-51825

(51) Int. Cl.
H04L 12/56 (2006.01)

(52) U.S. Cl. .................. 370/389; 370/395.31; 370/428

(58) Field of Classification Search ................ 370/230, 370/235, 389, 390, 392, 395.31, 395.32, 370/412, 422, 428, 475; 711/216, 217, 218, 711/221
See application file for complete search history.

(56) References Cited

U.S. PATENT DOCUMENTS

| | | | | |
|---|---|---|---|---|
| 5,111,453 A | * | 5/1992 | Morrow ..................... | 370/401 |
| 5,138,611 A | * | 8/1992 | Carn et al. ................. | 710/316 |
| 5,343,471 A | | 8/1994 | Cassagnol | |
| 5,345,441 A | * | 9/1994 | Paker et al. ................. | 370/358 |
| 5,559,883 A | * | 9/1996 | Williams ..................... | 726/13 |
| 5,784,373 A | | 7/1998 | Satake et al. | |
| 5,790,546 A | | 8/1998 | Dobbins et al. | |
| 5,802,278 A | * | 9/1998 | Isfeld et al. ................. | 709/249 |
| 5,915,097 A | | 6/1999 | Chao | |
| 5,938,736 A | * | 8/1999 | Muller et al. ................ | 709/243 |
| 5,978,951 A | | 11/1999 | Lawler et al. | |
| 6,032,194 A | * | 2/2000 | Gai et al. .................... | 709/239 |
| 6,061,351 A | * | 5/2000 | Erimli et al. ................ | 370/390 |
| 6,088,356 A | * | 7/2000 | Hendel et al. ............... | 370/392 |
| 6,104,696 A | | 8/2000 | Kadambi et al. | |
| 6,154,462 A | * | 11/2000 | Coden ......................... | 370/403 |
| 6,304,575 B1 | * | 10/2001 | Carroll et al. ............... | 370/408 |
| 6,463,032 B1 | * | 10/2002 | Lau et al. .................... | 370/218 |
| 6,549,519 B1 | * | 4/2003 | Michels et al. ............. | 370/238 |
| 6,553,000 B1 | * | 4/2003 | Ganesh et al. .............. | 370/235 |
| 6,625,146 B1 | * | 9/2003 | Merchant et al. ........... | 370/389 |
| 6,658,015 B1 | * | 12/2003 | Merchant et al. ........... | 370/422 |
| 6,678,248 B1 | * | 1/2004 | Haddock et al. ............ | 370/235 |
| 6,678,269 B1 | * | 1/2004 | Michels et al. ............. | 370/389 |
| 6,907,469 B1 | * | 6/2005 | Gallo et al. ................. | 709/238 |
| 2002/0051450 A1 | * | 5/2002 | Ganesh et al. | |
| 2002/0067726 A1 | * | 6/2002 | Ganesh et al. | |
| 2003/0058864 A1 | * | 3/2003 | Michels et al. | |

* cited by examiner

Primary Examiner—Chi Pham
Assistant Examiner—Kevin Mew
(74) Attorney, Agent, or Firm—Robert E. Bushnell, Esq.

(57) ABSTRACT

An apparatus and a method for performing an efficient address search in an ethernet switch having a plurality of ports. Information packets where the source and destination addresses are one and the same are rejected and not processed. When destination address is not in a local port, the main look up table for the entire switch is then consulted. If the main look up table does not have the destination address, the main look up table learns the address and the port broadcasts the information packet to all ports in the switch. A hash algorithm is used to look up addresses in tables. Thus, more efficient processing of information in the switch can be realized.

12 Claims, 6 Drawing Sheets

| CMD | ID |
|---|---|
| SPECIFICATION INFORMATION ACCORDING TO CMD INFORMATION ||

ADDRESS SEARCH APPARATUS AND METHOD IN ETHERNET SWITCH

CLAIM OF PRIORITY

This application makes reference to, incorporates the same herein, and claims all benefits accruing under 35 U.S.C. §119 from my application ADDRESS SEARCH APPARATUS AND METHOD IN ETHERNET SWITCH filed with the Korean Industrial Property Office on 22 Nov. 1999 and there duly assigned Ser. No. 51825/1999.

BACKGROUND OF THE INVENTION

1. Field of the Invention

The invention relates to a data network, and more particularly an apparatus and a method for performing an efficient address search in a switch network.

2. Description of the Related Art

Ethernet is a most typical protocol of LAN (Local Area Network) which occupies a very important portion in data networks. Ethernet is widely accepted in the industry already, and the application thereof reaches all kinds of data networks. At the present, since users are rapidly increasing and more various services are getting provided, bandwidth of a network is required to be wider than before. Providing wide bandwidth of a network enables converting from a repeater so called hub into a switch in a remarkably rapid speed. As compared to a repeater which shares a transmission medium, a switch efficiently uses only required sources from transmission means to receiver means thereby having a very rapid transmission speed.

Herein, "address search" means that an ethernet switch establishes required information to determine an output terminal, and collects and utilizes information for address. The address search is particularly important in an application in which management for address is highly required. Examples of the application include ARP (Address Resolution Protocol) management, NMS (Network Management System), RMON (Remote Monitoring) and etc.

Figure 1:
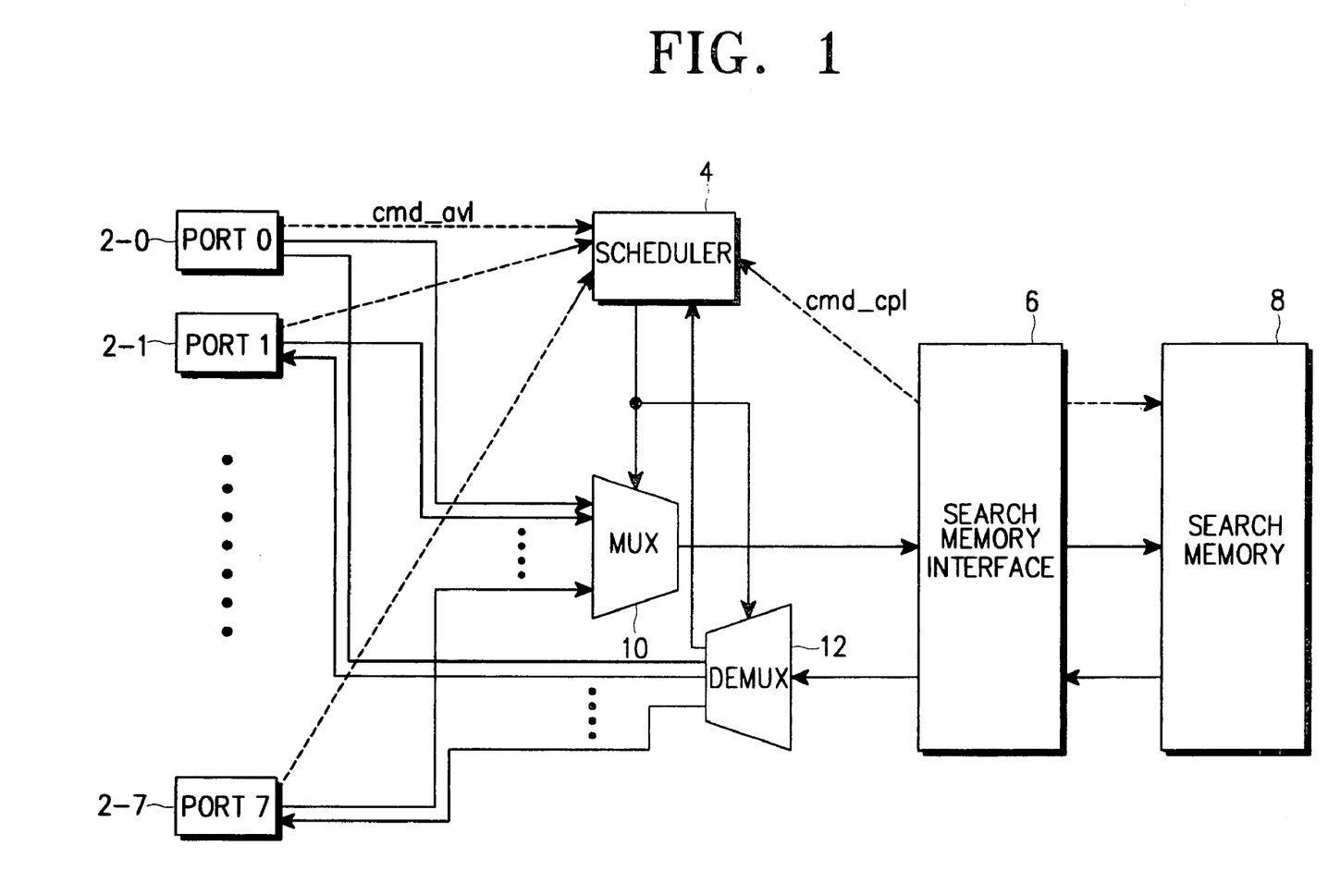
FIG. 1 is a view for showing an address searching method in an ethernet switch.

In an example of an address searching method in an ethernet switch as shown in FIG. 1, a search memory interface (SMI) 6 receives a header and a port number of an input packet from a PCU (Port Control Unit) in each of port devices 2-0, 2-1, . . . , 2-7 to establish data about source address on a search memory, and determines an output port of each packet on the basis of the establish data.

However, in FIG. 1, since the 8 port devices are required to determine output ports by using the same search unit, the input packet of one port (device) only can be searched while the remaining ports (devices) are left to wait. Also, there are some structural problems in realizing a search logic required for a management switch, i.e., a switch which has a control unit for controlling an ethernet switch when the switch structure is a non-management switch, i.e. a switch which does not have a control unit for controlling an ethernet switch. An interface for sharing address data with other units was not defined also. In other words, in the non-management switch structure, the address structure is not suitably realized for a management switch.

SUMMARY OF THE INVENTION

Therefore, it is an object of the present invention to provide an improved ethernet switch and switching process.

It is also an object of the present invention to provide an apparatus and a method for performing an efficient address search operation in an ethernet switch network.

It is another object of the present invention to provide an apparatus and a method in which conversion from a non-management switch structure into a management structure or a port expansion is easy.

According to the foregoing objects of the present invention, it is provided with a processing structure in which a number of ports use one search unit, said structure having a local search block corresponding to each of the ports to perform a search operation as a distributed processing structure. It is also provided with a structure in which an information exchange between the local search blocks and a main search block for port and a search operation on individual addresses can be proceeded without an error.

Furthermore, it is provided with an address search apparatus in an ethernet switch having a plurality of ports, having a local search unit corresponding to each of the plurality of ports; wherein the local search unit includes: a plurality of local search blocks for analyzing a destination address of an input packet received in the port thereof to search for a transmission port of the ethernet switch and provide a source address thereof; a main search unit for analyzing the source address to establish an address data structure of the plurality of local search blocks, and for responding to a destination address request from at least one of the plurality of local search blocks to provide the requested destination address to a corresponding local search block by using the address data structure; and a scheduler for controlling the local search blocks and the main search unit to enable an interface therebetween.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Referring to FIG. 1 in more detail, each of the port devices 2-0, 2-1, . . . , 2-7, which corresponds to each of ports 0, 1, . . . , 7 for example, includes a physical hierarchy unit for functioning as a physical hierarchy, a MAC (Medium Access Control) unit for functioning as a medium access control, and a PCU (Port Control Unit). When a packet is received by at least one port at random, some of the port devices 2-0, 2-1, . . . , 2-7 of the ports corresponding to the received packet, output control signal command availables (cmd_avl) to a scheduler 4, respectively. When receiving control signal cmd_avl, the scheduler 4 which is periodically operated controls one port to be selected via competition and enables an address search about the selected one port (device). In other words, when receiving the control cmd_avl, the scheduler 4 schedules a priority set on the basis of a predetermined control or a port selection order on the basis of a round robin, and provides a resultant port selection signal to both of a multiplexer (MUX) 10 and a demultiplexer (DEMUX) 12. The predetermined control can be set by users for example. The multiplexer 10 selects one from 8 port devices 2-0, 2-1, . . . , 2-7) in response to the port selection signal provided by the scheduler 4, and receives a header and a port number from the selected port device to output to search memory interface 6. The header can include destination address, source address, and etc. Then, the search memory interface 6 establishes data about the source address on the search memory 8, and determines an output port corresponding to the selected input packets on the basis of the established data. After determining the output port, the search memory interface 6 outputs the determined information to the corresponding one of the 8 port devices 2-0, 2-1, . . . , 2-7 via the demultiplexer 12. After that, the search memory interface 6 outputs a control signal cmd_cpl which notifies completion of output port determination to the scheduler 4.

Figure 2:
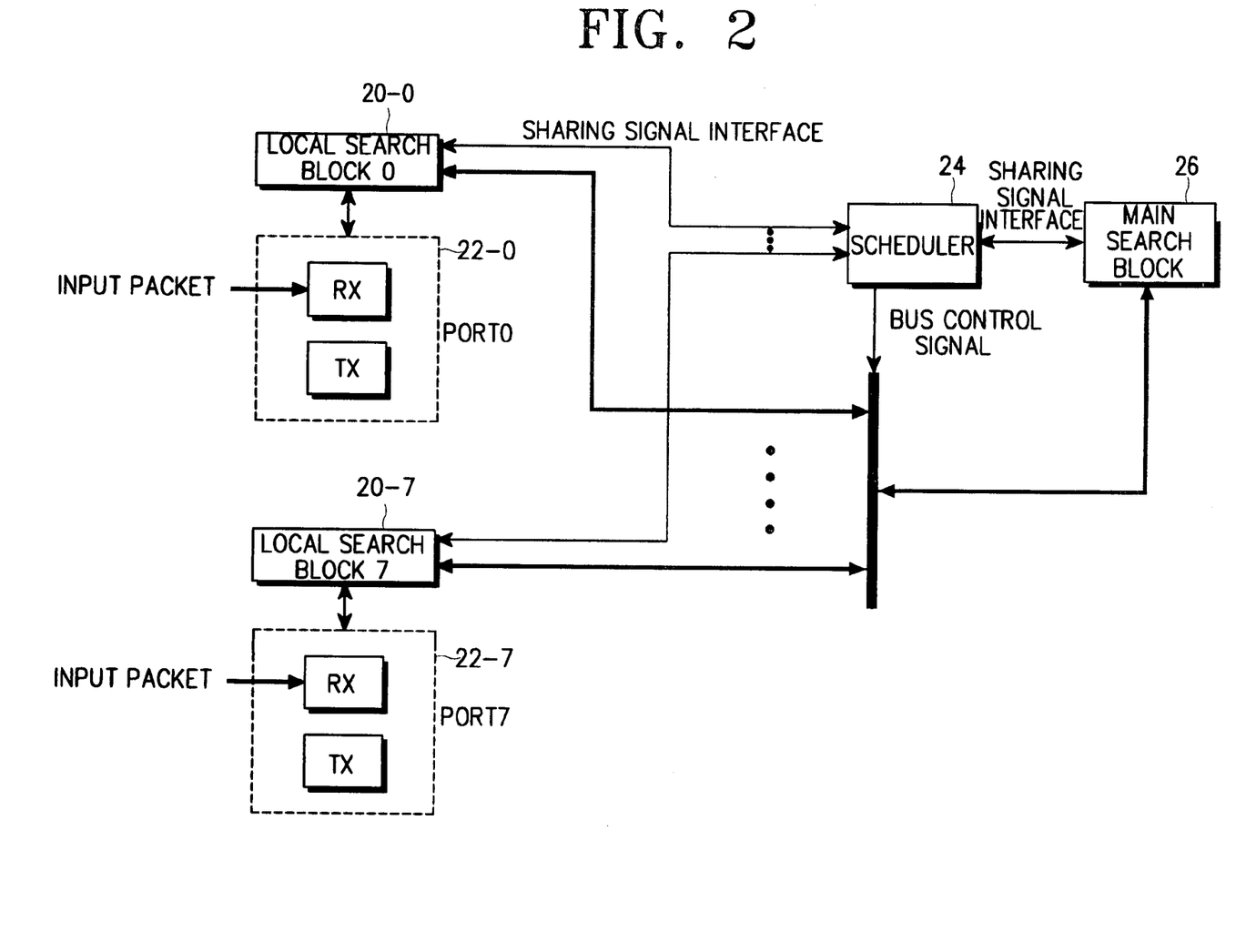
FIG. 2 is a view for showing an address searching method in an ethernet switch according to an embodiment of the present invention.

FIG. 2 is a view for showing an address searching method in an ethernet switch according to an embodiment of the present invention. Referring to FIG. 2, an address searching apparatus according to an embodiment of the present invention includes 8 local search blocks 20-0, 20-1, . . . , 20-7, for example, and one main search block 26, in which an interface protocol is defined for information exchange between the local search blocks 20-0, 20-1, . . . , 20-7 and the main search block 26. Each of the 8 local search blocks 20-0, 20-1, . . . , 20-7 is arranged to correspond to each of 8 port devices 22-0, 22-1, . . . , 22-7 arranged within the ethernet switch, and the main search block 26 is arranged between the scheduler 24 and a search memory (not shown in FIG. 2). Each of the 8 local search blocks 20-0, 20-1, . . . , 20-7 analyzes a destination address of an input packet received in a port thereof to search for a transmission port of the ethernet switch, and the main search block 26 analyzes the destination address to establish an address data structure of the local search blocks. When transmitting and receiving data, the scheduler 24 which is periodically operated permits a port to be selected from the plurality of ports and interfaces control signals between the local search blocks 20-0, 20-1, . . . , 20-7 and the main search block 26.

Figure 3:
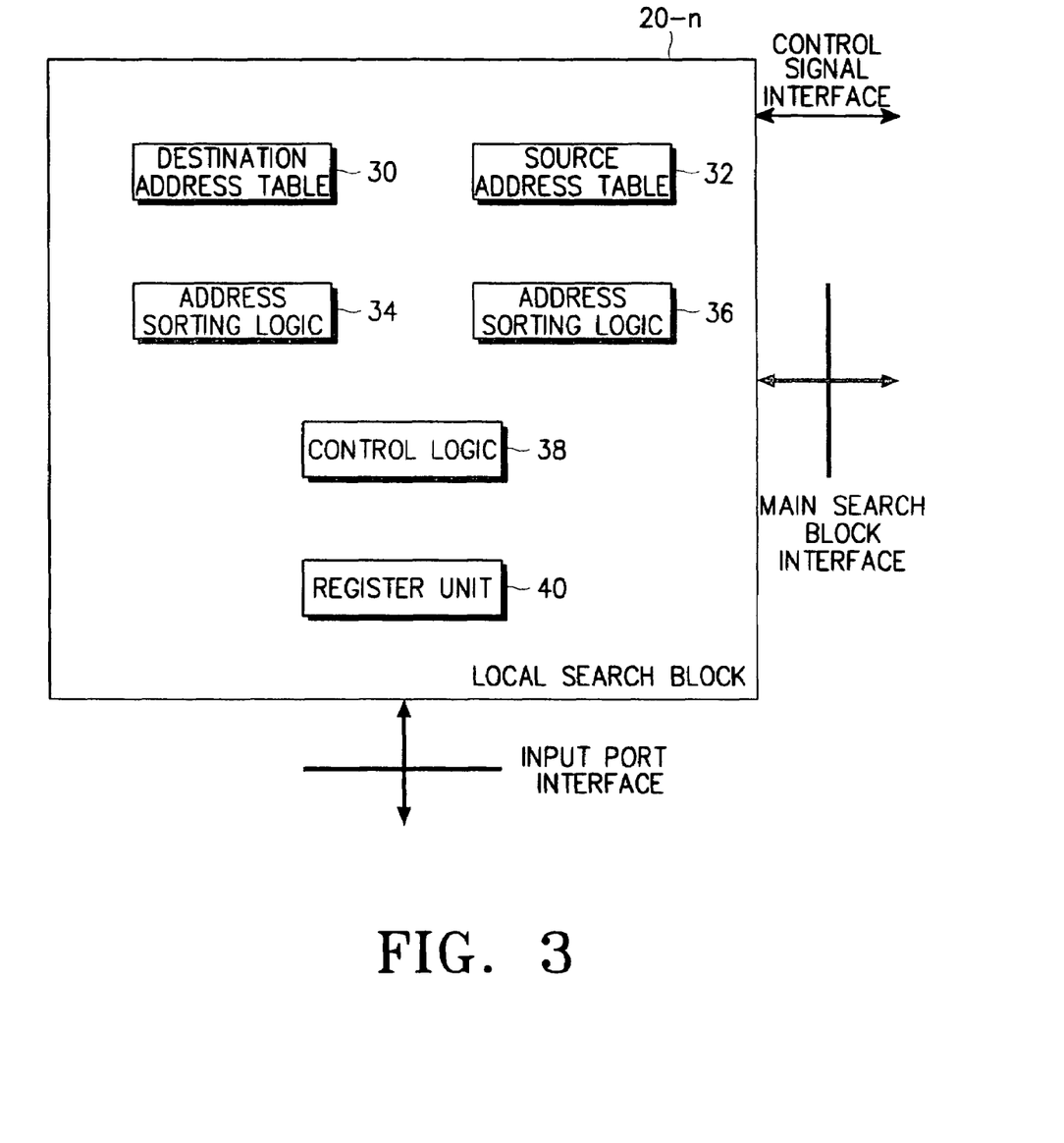
FIG. 3 is a detailed block diagram for showing one of local search blocks shown in FIG. 2.

FIG. 3 is a detailed block diagram for showing one of local search blocks 20-0, 20-1, . . . , 20-7 shown in FIG. 2. Referring to FIG. 3, each of the local search blocks 20-0, 20-1, . . . , 20-7 has 2 address tables, i.e., a destination address table 30 and a source address table 32. In the destination address table 30, destination address and destination information (such as transmission port numbers) are matched. In the source address table 32, source addresses and source information (such as input port numbers) are matched. Also, address sorting logics 34 and 36 corresponding to the destination address table 30 and the source address table 32 respectively are arranged to sort an ethernet address into groups as many as necessary. Each of the local search blocks 20-0, 20-1, . . . , 20-7 has a control logic 38 for controlling the corresponding search block and a register unit 40 for temporal storage of data.

Figure 4:
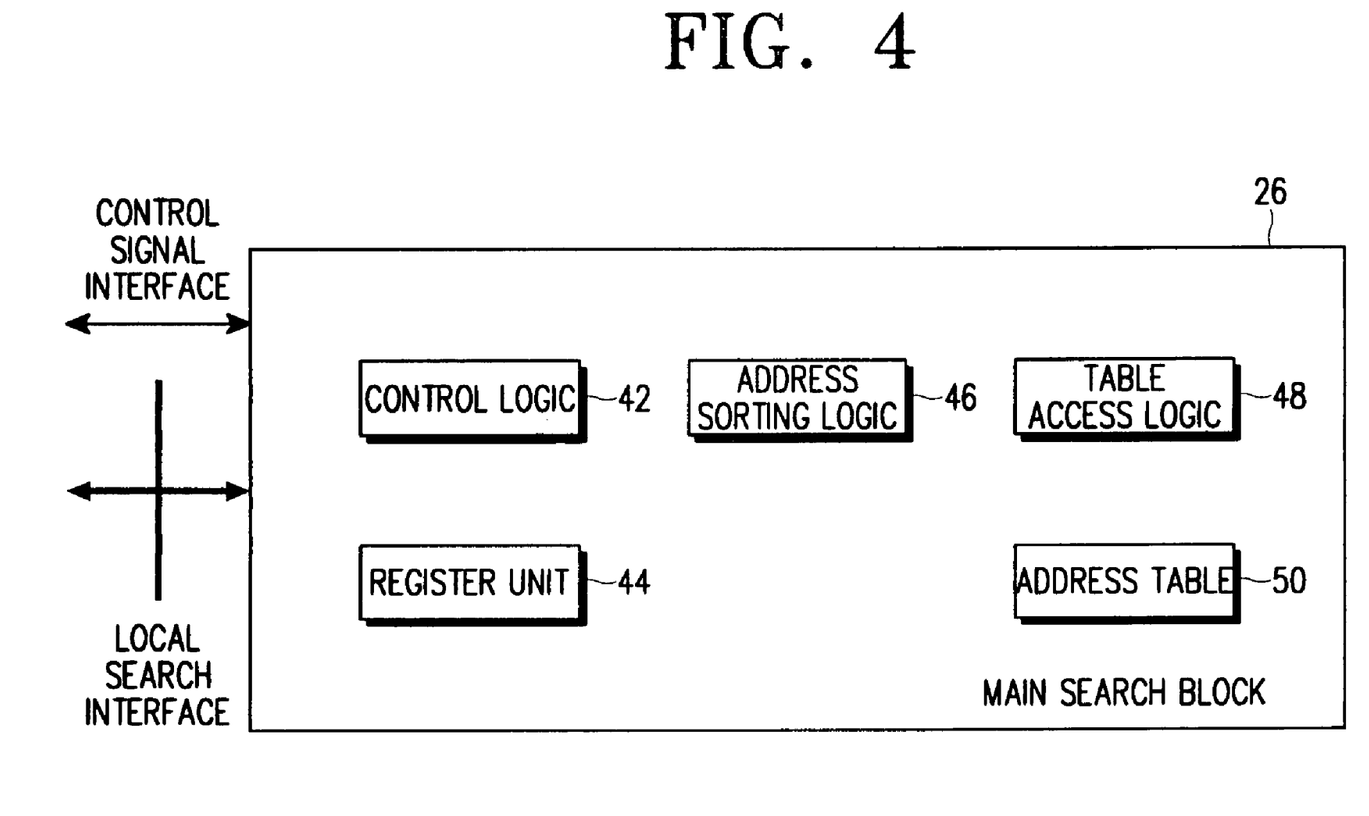
FIG. 4 is a detailed block diagram of a main search block shown in FIG. 2.

FIG. 4 is a detailed block diagram of the main search block 26 shown in FIG. 2. The main search block 26 includes an address table 50, a table access logic 48, an address sorting logic 46, a control logic 42, and a register unit 44. The address table 50 is a memory for sorting addresses known to a system. In using the memory, a hash function ("/") is used to satisfy characteristics of the ethernet address. The hash function can be subdivided according to methods for obtaining hash keys, in which a method using XOR gate (exclusive OR gate) is adapted in an embodiment of the present invention. The table access logic 48 is a kind of access logic for accessing the address table 50 structured as above. The table access logic 48 performs the foregoing hash function. Therefore, when the individual addresses are searched, desired information stored in the address table 50 can be obtained via the table access logic 48. The address sorting logic 46 is a logical function block for classifying addresses having same characteristics in order to store data known to the system into the address table 50. The control logic 42 and the register unit 44 have blocks, i.e., an external processor and an interface for controlling each of these blocks according to functions and for determining conditions thereof. Also, the control logic 42 and the register unit 44 exchange information via an interface between the local search blocks 20-0, 20-1, . . . , 20-7 corresponding to each of the port device 22-0, 22-1, . . . , 22-7, and construct each address table.

Figure 5:
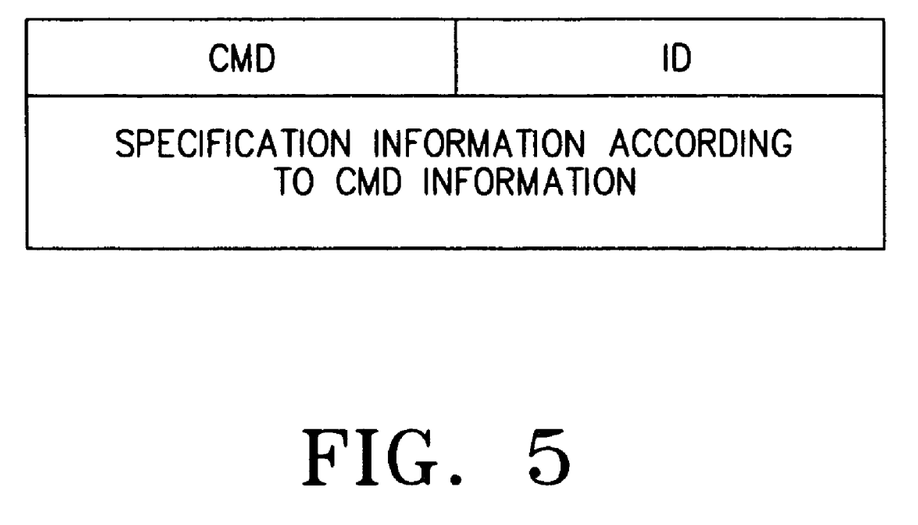
FIG. 5 is a message format diagram for an interface between search blocks according to an embodiment of the present invention.

FIG. 5 is a message format diagram for an interface between the search blocks according to the embodiment of the present invention. Referring to FIG. 5, messages include a command field CMD, an ID field (identifier field), and a specification information field according to the CMD information. In the command field CMD, commands (CMD) such as search, add, delete and update can be recorded, and the ID field includes a transmitter ID for transmitting the messages of FIG. 5 and a receiver ID for receiving the messages. For example, when transmitting messages from the local search block 20-0 to the main search block 26, the transmitter ID will be the ID of the local search block 20-0 and the receiver ID will be the ID of the main search block 26. The specification information field according to the CMD information includes specification information according to the CDM information. The CMD information may include search, add, delete, update and etc. as described above, and the resultant specification information may include MAC address, header information of a packet, port ID, device number, input port number and etc. The header information of a packet includes source and destination addresses.

Figure 6:
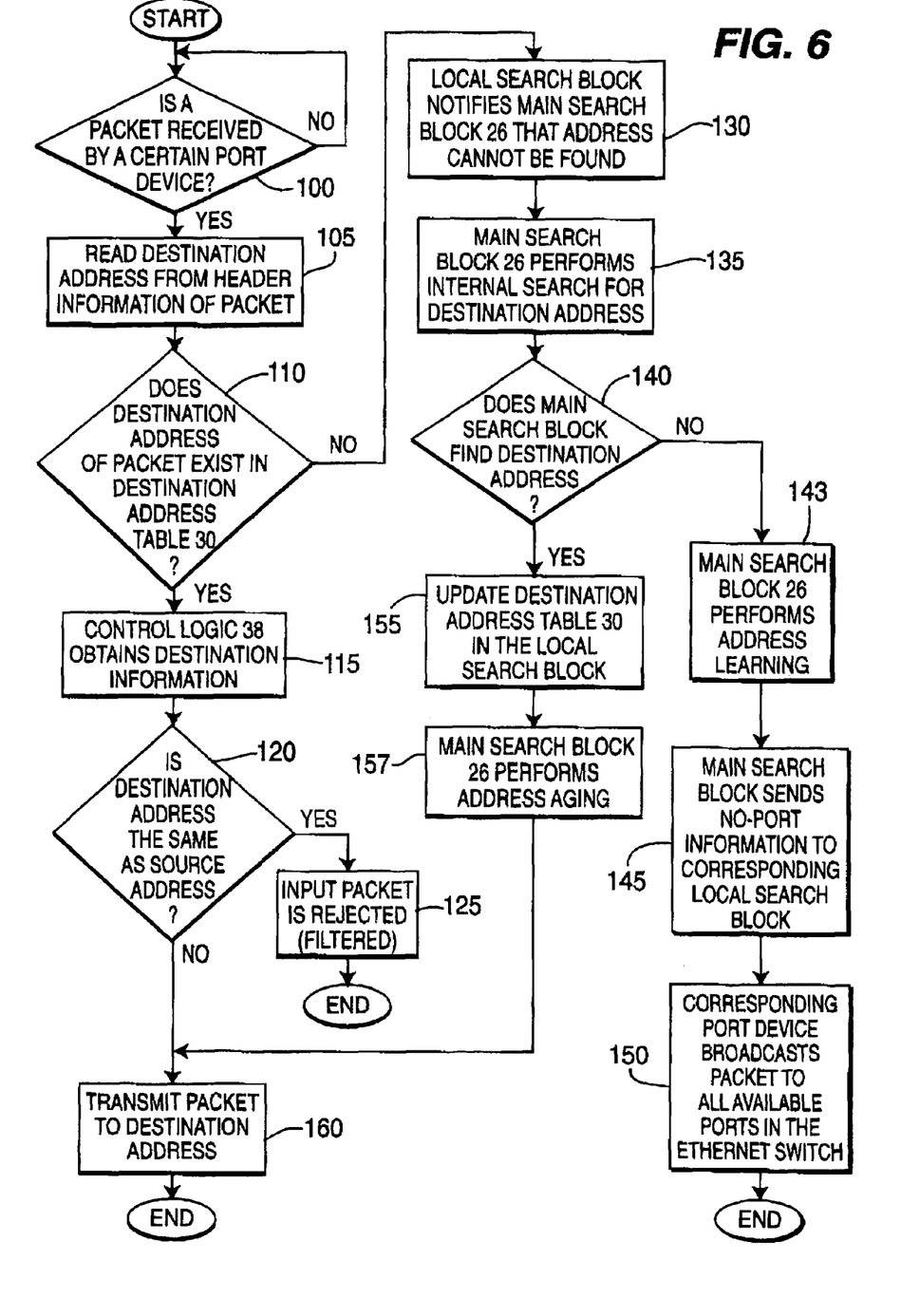
FIG. 6 is a flow chart illustrating how an incoming packet of information is sent to a destination port according to an embodiment of the present invention.

Hereinafter, operations for address search according to the embodiment of the present invention will be described in more detail in reference to FIG. 2 to FIG. 5 in conjunction with FIG. 6. When a packet is received (Step 100) in a certain port device 22-N (herein, N is one of 0 to 7 ) of the 8 port devices 22-0, 22-1, . . . , 22-7, the local search block 20-N corresponding to the port device 22-N reads a destination address from a header information (Step 105) of the packet to compare with the destination addresses in the destination address table 30 (Step 110). The foregoing comparing is performed by the address sorting logic 34. The address sorting logic 34 performs address sorting, i.e., an operation for classifying an ethernet address into groups as many as necessary, thereby more easily accessing the internal destination table 30. An example of algorithms for classifying into groups may include a hash algorithm. When the destination address of the input packet exists in the address table 30, the control logic 38 of the local search block 20-N obtains a required information (Step 115), i.e., a destination information (transmission port). After that, the local search block 20-N rejects the input packet via filtering when the destination information (transmission port) is provided to be its own port (Step 125). Describing the above in more detail, when obtaining the destination information (transmission port), the address sorting logic 36 compares the source addresses in the source address table 32 with the destination address of the input packet (Step 120). When the destination address of the input packet exists in the source address table 32, the input packet is rejected by filtering (Step 125). In other words, the packet is proved that transmission to other port is not required, and then filtered. In turn, when the destination information (transmission port) obtained from the destination address table 30 is not identical with the destination address of the input packet in the source address table 32, or when the destination information (transmission port) obtained from the destination address table 30 is a different port, the address sorting logic 36 provides the corresponding information to the corresponding port device 22-N.

In turn, when the destination address of the input packet does not exist in the address table 30 in the local search block 20-N (Step 110), the address sorting logic 36 receives a corresponding destination address from the main search block 26 to update the destination address table 30 in the local search block 20-N. Describing the above in more detail, the local search block 20-N sends a message loaded with a search command in the command field CMD, a source ID and a destination ID in the identifier field ID, and header information of the packet in the specification information field according to the CMD information to the main search block 26 (Step 130), according to the protocol defined between the local search blocks 20-0, . . . , 20-7 and the main search block 26. Then, the main search block 26 performs an internal search (Step 135) about the destination address in the received header information, and when the address search is successfully completed, transmits an information about the searched destination address to the corresponding local search block 20-N. Then, the corresponding local search block 20-N transmits the destination information (transmission port) received from the main search block 26 to the corresponding port device 22-N thereby permitting the port device 22-N to transmit the input packet (Step 160), and updates the table information of the destination address table 30 (Step 155) in the local search block 20-N at the same time. If an information of the corresponding destination address (hereinafter referred to "port information") does not exist in the main search block 26 in addition to being found in the local search block, the main search block 26 sends a no-port information of the destination to the corresponding local search block 20-N (Step 145) since the port information about the address does not exist in the present system. When the corresponding local search block 20-N receives the no-port information, the corresponding port device 22-N performs a forwarding operation. The forwarding operation means broadcasting (Step 150). In other words, since it is not determined to which port the input packet is required to be transmitted, the packet is transmitted to all available ports (except input ports) in the ethernet switch. In turn, the local search blocks 20-0, 20-1, . . . , 20-7 corresponding to the ports respectively and the main search block 26 periodically perform an update operation of the source and destination addresses.

Hereinafter, the operation will be described in detail. The local search blocks 20-0, 20-1, . . . , 20-7 corresponding to the ports respectively periodically transmit header information (such as source addresses, destination addresses and etc.) to the main search block 26 so that the main search block 26 can perform an address update (Steps 143 & 157). The main search block 26 establishes an address data structure via address learning via input of the header information (such as source addresses, destination addresses and etc.) transmitted from the local search blocks 20-0, 20-1, . . . , 20-7 which correspond to the ports respectively. In other words, the information used for establishing the address data are port information of the sub hosts of the system and addresses allocated thereto. This information can be obtained since each of the hosts causes its address information to be included in the header of the packet while transmitting and receiving the packets. The information corresponding to the source address, as though it may be varied according to objects to which the system is aimed, can be supposed simply as a port information in the system (i.e., as to which port the source address corresponds).

Describing the address learning process in more detail, the main search block 26 searches whether a corresponding information (such as address information, port information and etc.) exists in the address table 50 of the main search block 26 about the destination and source addresses (Step 140). When a corresponding information exists (Step 140=Yes), the main search block 26 performs an information update operation desired by the system including an address aging. Herein, the address aging means clearing old address data, i.e. address data which are not used for a predetermined period, from the addresses stored in the address table 50 of the main search block 26 (Step 157). Performing the information operation including the address aging like this can establish new information as address data. When a corresponding information does not exist (Step 140=No), the address learning operation is performed. The address learning is generally performed by an external processor, and data insertion is carried out into the link structure by using hash within the main search block 26 (Step 143). In other words, the search information (such as MAC address, port number and add command) connected in respect to the corresponding source address is provided by the external processor, but actual operation to connect data to the link according to the hash key is carried out in the main search block 26.

In turn, the local search block 20-N requests port information of the destination and source addresses to the main search block 26 when the destination and source addresses of the input packets do not exist in the destination table 30 and the source address table 32 of the local search block 20-N. Then, the main search block 26 provides port information of the requested destination address and source addresses to the local search block 20-N so that the local search block 20-N may update the destination and source addresses and corresponding port information in the destination address table 30 and the source address table 32.

As described above, the invention can reduce required time in a large amount by managing a small table for each port than search operation which are carried out via competition while sharing single search logic. Therefore, the main search block can carry out more tasks. Also, exchange of address information with other system can be carried out by conversion into a management switch structure or a port expansion, and the overall search efficiency can be enhanced by management of suitable table by each port.

While the invention has been described in detail by specific reference to preferred embodiments thereof such as an ethernet switch, it is understood that variations and modifications thereof may be made without departing from the true spirit and scope of the invention. In other words, the variations and modifications can be made to a switch network which include at least one of packet switch, asynchronous transfer mode (ATM) network and etc. Therefore, it should be understood that the true spirit and the scope of the invention are not limited by the above embodiment, but defined by the appended claims and the equivalents thereof.

What is claimed is:

1. An address search apparatus in an ethernet switch, said apparatus comprising:
   a plurality of ports;
   a plurality of local search blocks corresponding to each of said plurality of ports, each of said plurality of local search blocks configured to analyze a destination address of an input packet received in the port thereof and to search for a transmission port of said ethernet switch and provide a source address thereof;
   a main search block configured to analyze said source address to establish an address data structure of said plurality of local search blocks, said main search block being also configured to respond to a destination address request from at least one of said plurality of local search blocks by providing said requested destination address to a corresponding local search block by using said address data structure upon said main search unit having said destination address, said main search block being further configured to respond to a destination address request from at least one of said plurality of local search blocks by sending a "no port" signal to said at least one of said plurality of local search blocks upon said main search block not having said destination address; and
   a scheduler for controlling said local search blocks and said main search block to enable an interface therebetween.

2. The address search apparatus according to claim 1, each of said plurality of local search blocks includes:
   a destination address table having destination addresses and destination information corresponding to said destination addresses which are matched therein;
   a source address table having source addresses and source information corresponding to said source addresses which are matched therein;
   an address sorting logic configured to classify an ethernet address into groups as many as necessary, and corresponding to each of said destination address table and said source address table;
   a control logic for control of corresponding local search blocks; and
   a register block for temporal storage of data.

3. An address search apparatus in an ethernet switch, said apparatus comprising:
   a plurality of ports;
   a plurality of local search blocks corresponding to each of said plurality of ports, each of said plurality of local search blocks configured to analyze a destination address of an input packet received in the port thereof and to search for a transmission port of said ethernet switch and provide a source address thereof;
   a main search block configured to analyze said source address to establish an address data structure of said plurality of local search blocks, said main search block also configured to respond to a destination address request from at least one of said plurality of local search blocks by either providing said requested destination address to a corresponding local search block by using said address data structure when said main search block has said destination address or by sending a "no port" signal to said at least one of said plurality of local search blocks when said main search block does not have said destination address; and
   a scheduler for controlling said local search blocks and said main search unit to enable an interface therebetween, said main search block includes:
   an address table for storing addresses known to the ethernet switch system and port information corresponding to said addresses;
   a table access logic for accessing said address table;
   an address sorting logic for classifying addresses having same characteristics to store data known to the ethernet switch system into said address table; and
   a control block for control and condition detection of elements.

4. An address search method in an ethernet switch, said method comprising the steps of:
   determining whether or not a port has received an input packet for transmission;
   reading a destination address from a header of said input packet;
   determining whether said destination address exists in a local search block of said port;
   filtering the received input packet when said destination address and source address are the same, to thereby purge the input packet;
   updating a destination address received from a main search block when the destination address does not exist in the local search block of said port and when said main search block includes the destination address; and
   sending no-port information from said main search block to said port if said main search block does not comprise said destination address; and
   broadcasting said input packet to all ports in said Ethernet switch.

5. The method of claim 4, further comprising the step of aging, wherein said main search block purges addresses that have not recently been used.

6. The method of claim 4, further comprising the step of address learning, wherein said main search block adds said destination address to its address table.

7. The apparatus of claim 1, each of said plurality of local search blocks being configured to broadcast said input packet to all of said plurality of ports when in receipt of said "no port" signal from said main search block.

8. The apparatus of claim 1, said plurality of local search blocks being configured to compare said destination address of said received input packet with addresses stored in a table within using a hash algorithm.

9. The apparatus of claim 1, each local search block being configured to filter all received input packets that have a destination address the same as its own port.

10. The apparatus of claim 2, the address sorting logic and the control logic being configured to determine whether the source address and the destination address of a received input packet are the same and the address sorting logic and the control logic being configured to filter a received input packet when the source address and the destination address are the same.

11. The apparatus of claim 2, said address sorting logic and said control logic being configured to perform a hash algorithm for said classifying the ethernet address into groups.

12. The method of claim 4, said updating comprising:
   performing an internal search for the destination address of header information received from said local search block in said main search block; and
   performing, when the address search is finished, an update by sending the searched destination address to the corresponding local search block.

* * * * *